2 Sheets—Sheet 1.

W. JONES,

Assignor, by mesne assignments, to the AMERICAN AXLE AND WHEEL COMPANY.

CARRIAGE AXLE.

No. 10,583. Reissued Apr. 21, 1885.

WITNESSES:

Geo. H. Fraser.

E. B. Bolton

INVENTOR:

Willis Jones

By his Attorneys,

Burke Fraser & Connett

N. PETERS, Photo-Lithographer, Washington, D. C.

2 Sheets—Sheet 2.

W. JONES,

Assignor, by mesne assignments, to the AMERICAN AXLE AND WHEEL COMPANY.

CARRIAGE AXLE.

No. 10,583. Reissued Apr. 21, 1885.

WITNESSES:

Geo. H. Fraser.

E. B. Bolton

INVENTOR:

Willis Jones

By his Attorneys,

Benj. Fraser & Connett

N. PETERS, Photo-Lithographer, Washington, D. C.

UNITED STATES PATENT OFFICE.

WILLIS JONES, OF BROOKLYN, NEW YORK, ASSIGNOR, BY MESNE ASSIGNMENTS, TO THE AMERICAN AXLE AND WHEEL COMPANY OF NEW YORK.

CARRIAGE-AXLE.

SPECIFICATION forming part of Reissued Letters Patent No. 10,583, dated April 21, 1885.

Original No. 286,139, dated October 2, 1883. Application for reissue filed March 12, 1885.

*To all whom it may concern:*

Be it known that I, WILLIS JONES, a citizen of the United States, and a resident of Brooklyn, in the county of Kings and State of New York, have invented certain new and useful Improvements in Carriage Axles and Hubs, of which the following is a specification.

The object of my invention is to improve the construction of the arms of axles for connecting the wheel more securely thereto and more effectually preventing breakage.

My invention also has for its object the provision of an improved hub for rotating upon said arm.

The exact subject-matter claimed as new will be hereinafter specifically set forth.

Figure 1:
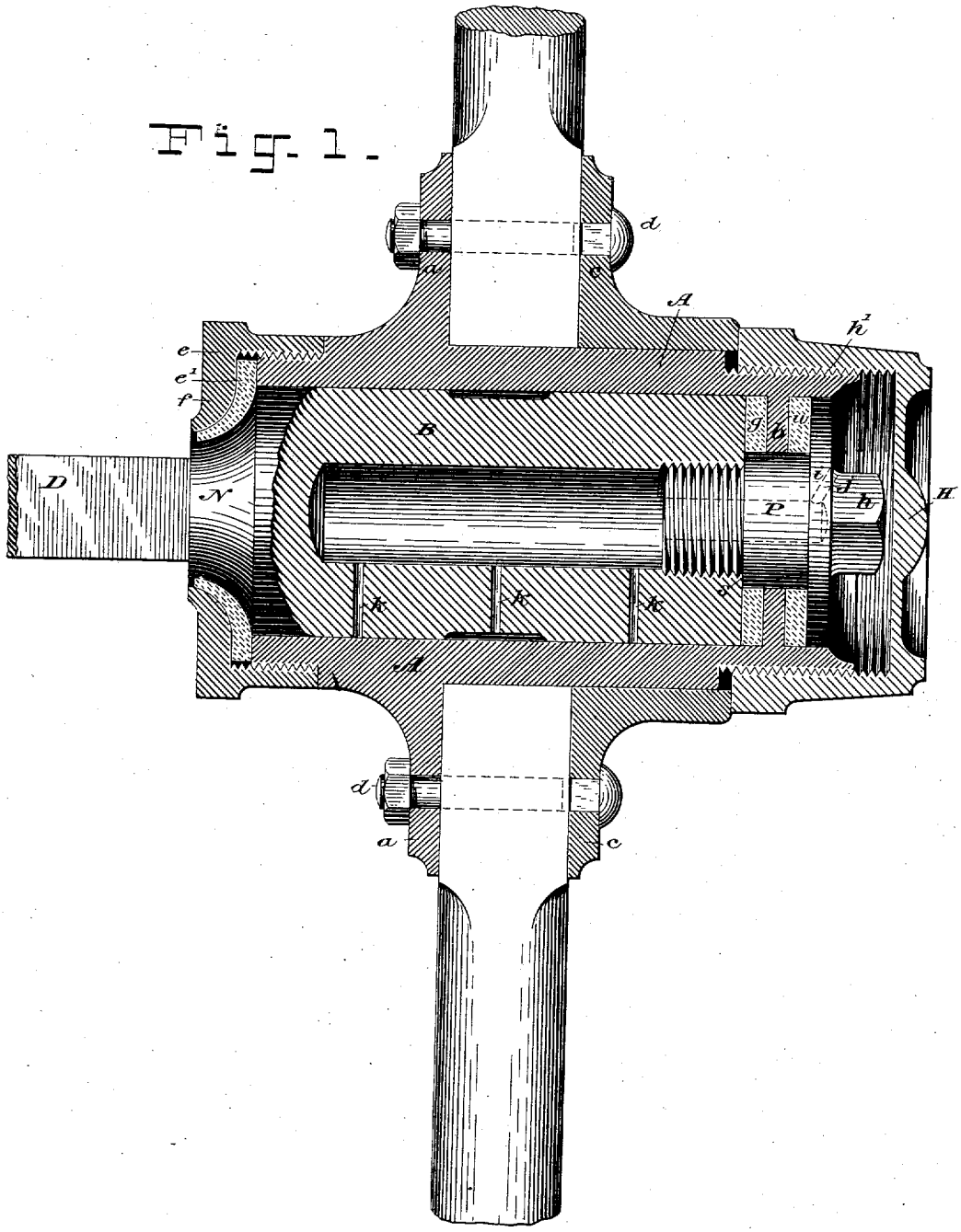
Figure 2:
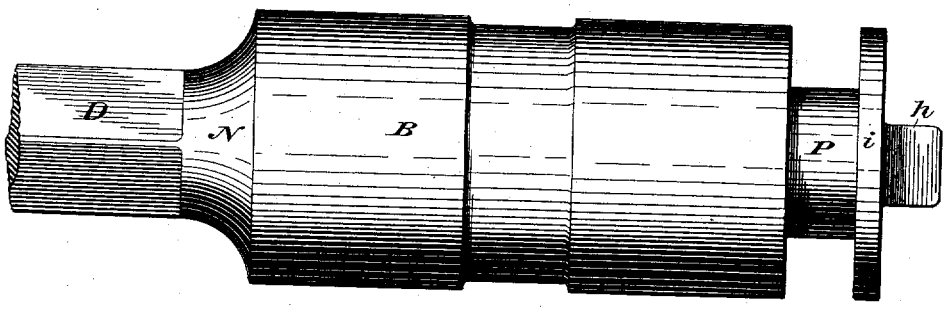

Figure 1 in the accompanying drawings is a transverse vertical section of an axle-arm and hub embodying my improvements, showing their relations to each other, and the means by which they are connected together. Fig. 2 is an elevation of the axle-arm removed, viewed in a direction cornerwise of the square bed of the axle.

In Fig. 1, A represents the main body of the hub, of the form which I prefer to employ in connection with my improved axle-arm, which hub is preferably made of metal, and consists, principally, of a cylindrical shell, which is provided with annular lateral projections or flanges *a* and *b*, the former extending outward for the attachment of the spokes, and the latter projecting inward for holding the axle in place. Both of these projections may be cast in one piece with the body of the hub. An annular flange, *c*, similar in form and proportions to the projection *a*, is fitted upon the exterior of the body A. The ring *c* and annular projection *a* serve, by means of the bolts *d*, to clamp the spokes in place. The exact manner in which the spokes are united to the hub is well known, and for this reason a more detailed description thereof is deemed unnecessary.

I form that portion of the axle which is inclosed in the hub of considerably greater diameter than the cornerwise thickness of the body or bed of the axle, for the purpose of giving greater wearing-surface and strength and facilitating the automatic lubrication of the hub. I make the junction of the body or bed D and enlarged arm B of the axle in the form of a neck, N, of a gradually-increasing size, for giving the utmost possible strength to that portion of the axle. This neck expands from the cornerwise thickness of the bed D to the full diameter of the cylindrical arm B, and the arm B is made with its bearing-surface of this same diameter from its junction with the neck to its outer end, as clearly shown. I have illustrated the arm as being cylindrical in shape, and, while this is the form I prefer to employ, the arm may be somewhat tapered from the neck N to its outer extremity, if desired.

A washer, *e'*, of leather or similar material, is made to surround the neck N of the axle, as shown. This washer is held in place by means of a flanged collar, *e*. A portion of the interior of this collar is screw-threaded and made to fit upon the corresponding screw-threaded end of the hub, as shown at *e*. When the collar *e* is screwed in place upon the hub, its flange *f* (having its inner face curved to correspond with the curved neck of the axle) bears against the washer *e'*, and thus secures the arm B of the axle in place within the hub. As is well known, metallic axles are usually manufactured in two pieces and their bodies welded together in the middle of their length, and therefore the collar *e* should be made to encircle the axle by being slipped over the end to be welded before its union with the other portion. The washer *e'* may also be slipped over the end of the axle before welding, or it may be divided by a radial slit and so put on after welding.

Against the annular projection *b* of the hub A, I place another leather washer, *g*, which rests against the extremity of the axle-arm.

The interior of the end of the arm B is screw-threaded for a short distance, and into this cavity is screwed the plug P. This plug preferably is formed with a square extremity, *h*, to enable it to be turned by means of a wrench. The plug is made hollow for a portion of its length, and is provided with an annular flange, *i*, the greatest diameter of which is equal to the interior diameter of the outer end of the hub. The plug P is provided with a shoulder, *s*, which latter is designed to be tightly screwed against the end of the arm, so that the plug forms virtually a continuation of the arm, and the flange *i* is fixed at an invariable distance from the end of the arm, and remains stationary while the hub revolves around it. The plug, when screwed in place, secures the washer *g* in position and holds the washer *w* between projection *b* and flange *i*. By means of these washers an easy movement is given to the hub, and, as they are made of leather or similar elastic material, they act to cushion the projection *b*, so that injury to the parts caused by longitudinal shocks is almost entirely avoided. I prefer to form a hole, *j*, extending obliquely from the exterior to the interior of the plug P, for conveying lubricating-oil to the interior of the axle. By means of the hollow arm of the latter a considerable quantity of oil may be stored therein, and by means of the series of holes *k k k*, extending radially from the interior to the exterior of the extremity of the arm B, the oil contained in the hollow portion of the arm may be automatically conveyed to the exterior of the arm and interior of the hub.

A cap, H, screw-threaded in its interior, is fitted upon the exterior of the correspondingly screw-threaded extremity of the hub, as shown at *h'*, and serves to prevent the accumulation of dust and gives finish to the hub.

By means of my improvements I am enabled to produce an axle-arm possessing the utmost possible strength, and, owing to the secure manner in which the axle is united with the hub, their accidental separation is rendered almost impossible, since, should the cap H and plug P both become detached, the axle would still be held in place by means of the collar *e*, which would resist the longitudinal thrust in one direction, while the projection *b* resists it in the opposite direction.

It may be preferable in some instances (and especially when the hub and axle are to be employed in connection with vehicles designed for light work) to dispense with the plug P. This may be done by so forming the projection *b* that it will extend across the end of the hub, when the axle will be held against the then permanently-closed end of the hub by means of the collar *e*. In this arrangement an aperture in the end of the hub may be made to allow of the admission of oil.

I am well aware that prior to my invention axles have been made the arms of which are of a diameter equaling the cornerwise thickness of the bed; also, that the arms have been of a greater diameter than the cornerwise thickness of the bed, with a flange or "collar" at the neck of a greater diameter than the arm, and a curved neck joining the bed to said collar. My axle differs from all prior forms, so far as I am aware, in that the bearing-surface of the cylindrical arm is the portion of largest diameter, (there being no flange projecting beyond it,) and is of substantially uniform diameter from where it joins the neck to the outer end. Its diameter being greater than the cornerwise thickness of the bed, the neck N forms a shoulder against which the collar *e* may bear.

The advantages resulting from my improved construction of the axle-arm may be enumerated as follows: First, owing to the greatly-increased diameter of the arm, and its neck of gradually-increasing size, greatly-increased strength is given to the axle, and the breakage of the same at the point where the arm joins the bed of the axle, which so often occurs in the usual form of axle with square shoulders, is rendered almost impossible; second, the increased diameter of the arm gives greater wearing-surface than heretofore attained, thus reducing the play between the arm and hub caused by the friction of the parts under any given amount of usage; third, the increased diameter of the arm allows of a large oil-reservoir being formed without unduly decreasing the strength of the arm, and thus enables the automatic supply of oil to the wearing-surfaces to continue for a correspondingly-increased length of time.

I claim as my invention—

1. A vehicle-axle consisting of the bed, a cylindrical arm of greater diameter than the cornerwise thickness of the bed, with its bearing-surface of substantially uniform diameter from end to end, and a neck of gradually-increasing thickness joining the bed and arm, and expanding from the cornerwise thickness of the bed to the full diameter of the arm, as set forth.

2. A vehicle-axle consisting of the bed, a cylindrical arm of uniform diameter exceeding the cornerwise thickness of the bed, and a neck at their junction expanding to the diameter of the arm, in combination with a hub fitting said cylindrical arm, and a collar attached to the inner end of the hub, having a flange contracted to a diameter less than that of the axle-arm, and adapted to bear against said neck on the axle, substantially as set forth.

3. The combination, substantially as hereinbefore set forth, with the axle, consisting of the bed D, the neck N, expanding to beyond the cornerwise diameter of the bed, and the hollow cylindrical arm B, of uniform diameter from its junction with said neck, of the hub A, having the projection *b* bearing against said axle at one end of the arm, and the collar *e* bearing against said neck at the opposite end of the arm.

4. The combination of the axle having enlarged cylindrical arm B, and flange *i*, fixed at an invariable distance beyond its end, with cylindrical hub A, having the annular projection *b* entering the space between the end of the arm and said flange, and the washers *g* and *w* on opposite sides of said projection, substantially as set forth, whereby longitudinal shocks are resisted by said projection *b* and cushioned by said washers.

5. The combination, substantially as hereinabove set forth, of the hollow cylindrical hub having the annular projection *b*, an axle having an enlarged arm, and the screw-threaded plug P, having shoulder *s* and flange *i*.

6. The combination, substantially as hereinbefore set forth, of a vehicle-axle having its arm of a greater diameter than the cornerwise thickness of the bed, and having a neck between said arm and bed of gradually-increasing thickness from the bed to the arm, and a hole formed longitudinally in said arm, with a cylindrical hub fitting said arm and having an annular projection, *b*, a collar attached to said hub and surrounding said neck, a washer intervening between said neck and collar, a bearing-flange, *i*, fixed to the axle-arm, and the washers *g* and *w*, respectively intervening between the extremity of said arm and projection *b*, and between projection *b* and flange *i*.

7. The combination, substantially as hereinbefore set forth, of the bed of the axle D, the enlarged hollow arm B, and the neck N with the hub A, fitting said arm, and having annular projection *b*, the collar *e*, attached to said hub and surrounding said neck, the intervening washer, *e'*, the screw-threaded hollow plug P, having shoulder *s* and flange *i*, the washers *g* and *w*, respectively intervening between the extremity of said arm and projection *b*, and between projection *b* and the flange *i*, and the cap H.

In witness whereof I have hereunto signed my name in the presence of two subscribing witnesses.

WILLIS JONES.

Witnesses:
ARTHUR C. FRASER,
GEO. BAINTON.